(12) United States Patent
Manoharan et al.

(10) Patent No.: US 9,740,402 B2
(45) Date of Patent: Aug. 22, 2017

(54) MIGRATING WORKLOADS ACROSS HOST COMPUTING SYSTEMS BASED ON REMOTE CACHE CONTENT USAGE CHARACTERISTICS

(71) Applicant: VMWARE, INC., Palo Alto, CA (US)

(72) Inventors: Manesh Varissery Manoharan, Bangalore (IN); Sivaprasad Kundoor Govindankutty, Bangalore (IN); Jubish Kulathumkal Jose, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 602 days.

(21) Appl. No.: 14/273,570

(22) Filed: May 9, 2014

(65) Prior Publication Data
US 2015/0277775 A1    Oct. 1, 2015

(30) Foreign Application Priority Data
Mar. 28, 2014    (IN) .......................... 1691/CHE/2014

(51) Int. Cl.
*G06F 3/06*    (2006.01)
*G06F 12/08*    (2016.01)
*G06F 12/0813*    (2016.01)
*G06F 9/455*    (2006.01)

(52) U.S. Cl.
CPC .......... *G06F 3/0608* (2013.01); *G06F 3/0619* (2013.01); *G06F 3/0665* (2013.01); *G06F 3/0689* (2013.01); *G06F 9/45558* (2013.01); *G06F 12/0813* (2013.01); *G06F 2003/0692* (2013.01); *G06F 2009/4557* (2013.01); *G06F 2212/152* (2013.01); *G06F 2212/6042* (2013.01)

(58) Field of Classification Search
CPC .... G06F 3/0608; G06F 3/0689; G06F 3/0619; G06F 3/0665; G06F 9/45558; G06F 2003/0692
USPC ......................................... 709/235
See application file for complete search history.

(56) References Cited

U.S. PATENT DOCUMENTS

| | | |
|---|---|---|
| 2008/0155537 A1 | 6/2008 | Dinda et al. |
| 2012/0324444 A1 | 12/2012 | Gulati et al. |
| 2014/0156958 A1 | 6/2014 | Dow et al. |
| 2014/0223122 A1* | 8/2014 | Butt ..................... G06F 9/5088 711/162 |

* cited by examiner

*Primary Examiner* — Tu Nguyen

(57) ABSTRACT

Techniques for migrating workloads across host computing systems in a virtual computing environment are described. In one embodiment, a workload executing on a first host computing system that accesses contents cached in a cache of a second host computing system via a remote memory channel for a predetermined number of times is identified. Further, migration of the identified workload to the second host computing system is recommended, thereby allowing the identified workload to access the contents from the second host computing system after migration in accordance with the recommendation.

41 Claims, 6 Drawing Sheets

| HASH SIGNATURE | UNIQUE HOST COMPUTING SYSTEM ID |
|---|---|
| HASHSIGNATURE1 | 2 |
| HASHSIGNATURE2 | 2 |
| HASHSIGNATURE3 | 2 |
| HASHSIGNATURE4 | 1 |
| HASHSIGNATURE5 | 2 |
| ⋮ | |
| HASHSIGNATUREN | 1 |

— 200

MIGRATING WORKLOADS ACROSS HOST COMPUTING SYSTEMS BASED ON REMOTE CACHE CONTENT USAGE CHARACTERISTICS

RELATED APPLICATIONS

Benefit is claimed under 35 U.S.C. 119(a)-(d) to Foreign application Serial No. 1691/CHE/2014 filed in India entitled "MIGRATING WORKLOADS ACROSS HOST COMPUTING SYSTEMS BASED ON REMOTE CACHE CONTENT USAGE CHARACTERISTICS", filed on Mar. 28, 2014, by VMware. Inc., which is herein incorporated in its entirety by reference for all purposes.

BACKGROUND

Nowadays, host based solutions are available that enable virtual desktop infrastructure (VDI) deployments capable of providing a robust platform for enterprises hosting virtual desktops from virtual management software (VMS). VDI deployments can scale up by increasing back-end computing power and by adding storage space for desktop consolidation. Storage space may preserve virtual machine (VM) images which load to memory of host computing systems to make the desktops live. A typical performance bottleneck is an input/output (I/O) request issued from a VM to an underlying storage for accessing contents from the VM images. Existing techniques leveraged in the VDI by configuring content based read cache (CBRC) in each host computing system to address such bottleneck issues (e.g., boot storms) when multiple VMs are powered on simultaneously.

However, the CBRC is a per host random access memory (RAM) based solution in the VDT. One limitation with such host specific solutions may be that it can be leveraged only within a single host computing system. However, virtual desktop environments are, typically, deployed on a cluster including multiple host computing systems. In such a virtual computing environment, the above limitation may become crucial. For example, in some implementations, the CBRC is limited to a maximum of 2 gigabytes (GB). During operation, once cached contents reach the maximum limit, the CBRC may remove existing cached contents to accommodate newer cache requirements. It can be envisioned that, during operation, the removed cached contents may be required again by one or more of VMs running on the host computing systems, which can result in unnecessary overhead as data needs to be fetched back into the cache. Further, the 2 GB limitation for the CBRC may become inadequate in the above host specific solution. Increasing the 2 GB limitation may not be a feasible solution view of other memory requirements. In addition, typically, in a virtual desktop environment, VMs are spanned across multiple host computing systems in a cluster, and similar contents are cached across all host computing systems. This can result in significant content cache duplication in the cluster.

DETAILED DESCRIPTION

In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined by the appended claims.

Embodiments described herein provide enhanced computer-based and network-based methods, techniques, and systems for migrating workloads (e.g., virtual machines (VMs)) across host computing systems based on remote cache content usage characteristics. The proposed technique dynamically updates statistics information associated with contents read by each VM executing on a first host computing system in an associated statistics counter for a predetermined time interval. For example, the statistics counter residing in the first host computing system includes statistics information associated with current read contents by each VM executing on the first host computing system. The statistics information may include information associated with locations of VMs in the host computing systems, contents requested by each VM, and a frequency of read requests made for same contents by each VM. Further, the proposed technique identifies the VM executing on the first host computing system that accesses the contents cached in a cache of a second host computing system for a predetermined number of times by analyzing the statistics information for remote cache content usage characteristics. The remote cache content usage characteristics may include a frequency of read requests made for contents cached in other host computing systems by each VM executing on a host computing system. Also, the proposed technique creates a recommendation to migrate the identified VM to the second host computing system based on the outcome of the analysis.

System Overview and Examples of Operation

Figure 1:
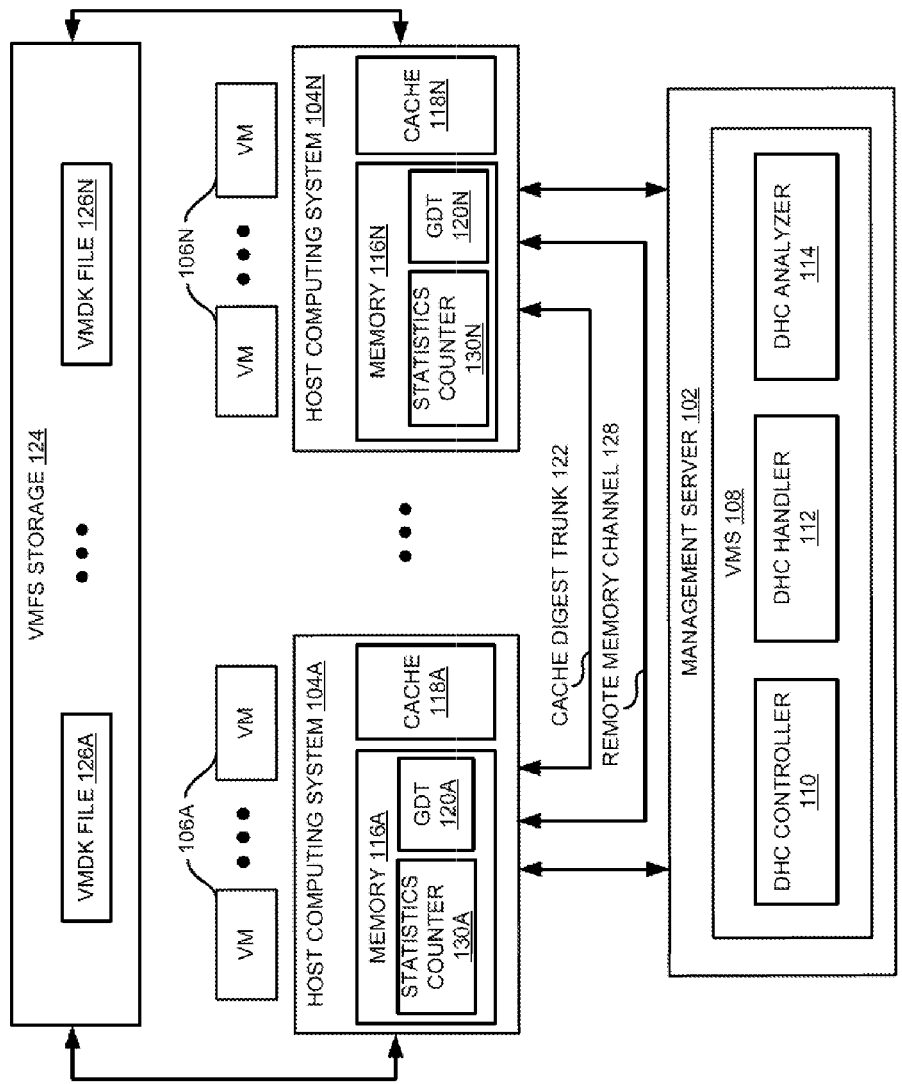
FIG. 1 is a block diagram illustrating a system for migrating workloads across host computing systems based on remote cache content usage characteristics in a virtual computing environment, according to an example embodiment.

FIG. 1 is a block diagram illustrating a system for migrating VMs across host computing systems based on remote cache content usage characteristics in virtual computing environment 100, according to an example embodiment. As shown in FIG. 1, virtual computing environment 100 includes host computing systems 104A-N and associated VMs 106A-N hosted by host computing systems 104A-N in a cluster. Further, host computing systems 104A-N include memories 116A-N (e.g., a main memory) and caches 118A-N, respectively. Example cache includes a reserved memory or a high speed storage device. Also as shown in FIG. 1, virtual computing environment 100 includes management server 102 that is communicatively coupled to host computing systems 104A-N. Further as shown in FIG. 1, management server 102 includes virtual management software (VMS) 108. Furthermore as shown in FIG. 1, 108 includes distributed host cache (DHC) controller 110, DHC handler 112, and DHC analyzer 114. DHC handler 112 may handle operations performed by DHC controller 110 and DHC analyzer 114. Moreover as shown in FIG. 1, virtual computing environment 100 includes virtual machine file system (VMFS) storage 124 (e.g., a storage device) communicatively coupled to host computing systems 104A-N. Also, VMFS storage 124 includes virtual memory disk (VMDK) files 126A-N associated with VMs 106A-N.

Figure 2:
FIG. 2 is a global digest table (GDT), according to an example embodiment.

In operation, DHC controller 110 identifies a VM executing on a first host computing system (e.g., host computing system 104A) that accesses contents cached in a cache of a second host computing system (e.g., cache 118N of host computing system 104N) via remote memory channel 128 (e.g., remote memory direct access) for a predetermined number of times. For example, the content may include a length of 4 kilobytes. In one embodiment, DHC controller 110 creates a global digest table (GDT) (e.g., GDT 120A) upon enabling a host computing system (e.g., host computing system 104A) in the cluster. For example, the GDT includes hash signatures of metadata associated with current read contents and associated host computing system identifiers (IDs). The host computing IDs are unique host computing IDs used for tagging the host computing systems in the GDT. In an example embodiment, DHC controller 110 looks for a cache digest trunk (CDT) port in a host computing system and assigns a unique host computing system ID to the host computing system when the host computing system includes the CDT port. The table 200 in FIG. 2 shows an example embodiment of a GDT. As shown in GDT 200, unique host computing system IDs 1 and 2 are unique host computing system IDs of any two of host computing systems 104A-N, respectively.

Further, DHC controller 110 loads created GDT 120A onto memory 116A of host computing system 104A. Furthermore, DHC controller 110 loads created GDT 120A onto memories 116B-N of each of remaining host computing systems 104B-N via CDT 122 upon powering on VMs 106B-N associated with each subsequent host computing system 104B-N in the cluster or upon enabling host computing systems 104B-N in the cluster. In other words, DHC controller 110 replicates GDT 120A in memories 116B-N of remaining host computing systems 104B-N via CDT 122. For example, CDT 122 is configured via kernel network settings as shown in example screenshot 300. In one example, CDT 122 is used to share GDT 120A across host computing systems 104A-N. In other words, via a designated port for CDT 122, DHC controller 110 replicates GDT 120A in memories 116B-N of remaining host computing systems 104B-N in the cluster. GDTs 120A-N in host computing systems 104A-N are identical to each other.

In addition, DHC controller 110 creates a statistics counter (e.g., statistics counter 130A) upon enabling host computing system 104A and loading GDT 120A in host computing system 104A. For example, statistics counter 130A includes statistics information associated with current read contents by each VMs 106A. In this example, the statistics information includes information associated with locations of VMs 106A in host computing system 104A, contents requested by each VMs 106A and a frequency of read requests made for same contents by each VMs 106A in host computing system 104A. Further, DHC controller 110 loads created statistics counter 130A onto memory 116A of host computing system 104A. Similarly, DHC controller 110 creates and loads statistics counters 130B-N onto memories 116B-N, respectively, upon loading GDTs 120B-N in associated host computing systems 104B-N.

Also, DHC controller 110 dynamically updates statistics information associated with contents read by VMs 106A in statistics counter 130A for a predetermined time interval. In one embodiment, DHC controller 110 receives read requests for contents stored in VMDK files 126A-N from VMs 106A associated with host computing system 104A. Further, DHC controller 110 determines whether each requested content associated with a VM executing on host computing system 104A is in one of caches 118A-N of respective host computing systems 104A-N using GDT 120A residing in host computing system 104A. Furthermore, DHC controller 110 allows the VM to read the requested contents from one of caches 118A-N, if the requested contents associated with the VM are in one of caches 118A-N. In one example embodiment, DHC controller 110 allows the VM to read the requested contents from caches 118B-N via remote memory channel 128, if the requested contents associated with the VM are in one of caches 118B-N. Also, DHC controller 110 dynamically updates the statistics information associated with the contents read by the VM in statistics counter 130A. In addition, DHC controller 110 allows the VM to read any of remaining requested contents from respective VMDK files 126A-N located in VMFS storage 124, stores the read contents in cache 118A of host computing system 104A, and adds the hash signatures of the metadata associated with the read contents along with the associated host computing system IDs in GDT 120A. Moreover, DHC controller 110 repeats the step of determining for the predetermined time interval.

In some embodiments, anytime a hash signature of metadata associated with current read content along with the associated host computing ID is added to one of GDTs (e.g., GDT 120A), DHC controller 110 substantially simultaneously updates all of remaining GDTs (e.g., GDIs 120B-N) via CDT 122. Further in some embodiments, anytime a host computing system gets added to the cluster, DHC controller 110 substantially simultaneously replicates GDT 120A to memory of the added host computing system via CDT 122. Also in some embodiments, any time a host computing system is removed from the cluster, DHC controller 110 substantially simultaneously updates each of GDTs 120A-N by removing corresponding hash signatures and associated host computing system ID via CDT 122.

Further, DHC analyzer 114 identifies the VM executing on host computing system 104A that accesses the contents cached in host computing system 104N for the predetermined number of times in the predetermined time interval via remote memory channel 128 by analyzing the statistics information in statistics counter 130A for remote cache content usage characteristics. For example, the remote cache content usage characteristics may include a frequency of read requests made for contents cached in other host computing systems by the VM. Furthermore, DHC analyzer 114 recommends migration of the identified VM to host computing system 104N, thereby allowing the identified VM to access the contents from host computing system 104N after migration in accordance with the recommendation. In one embodiment, DHC analyzer 114 creates a recommendation for migrating the VM to host computing system 104N in the cluster based on the outcome of the analysis. Moreover, DHC controller 110 and DHC analyzer 114 repeat the associated steps of dynamically updating, analyzing and creating the recommendation for a next predetermined time interval.

In one example, DHC analyzer 114 analyzes statistics information associated with contents read by VM1 for remote cache content usage characteristics. Further, DHC analyzer 114 determines that VM1 executing on host computing system1 read contents cached in a cache of host computing system2 for 25 times in a predetermined time interval using the remote cache content usage characteristics. In this example, a predetermined number of times VM1 can access the cache of host computing system2 is 25 times. Therefore, DHC analyzer 114 creates a recommendation to migrate VM1 to host computing system2, thereby allowing VM1 to access the contents from host computing system2 after migration in accordance with the recommendation. Also, DHC analyzer 114 creates the recommendation to migrate VM1 to host computing system2 based on available computing resources on host computing system2. For example, VM1 can be any of VMs 106A-N and host computing system1 executing VM1 and host computing system2 can be any of host computing systems 104A-N.

Also, although certain terms are used primarily herein, other terms could be used interchangeably to yield equivalent embodiments and examples. For example, the term "host computing system" may be used interchangeably with "physical host", "physical machine" or "physical device". Further for example, it is well-known that equivalent terms in the field of system virtualization or similar or related fields could be substituted for such terms as "physical computer," "hypervisor," "virtual machine," or the like. Further, the terms "virtual computing environment" and "virtual datacenter" are used interchangeably throughout the document. Furthermore, the terms "access" and "read" are used interchangeably throughout the document.

Numerous specific details are set forth herein, such as data formats and code sequences and the like, in order to provide a thorough understanding of the described techniques. The embodiments described also can be practiced without some of the specific details described herein, or with other specific details, such as changes with respect to the ordering of the logic, different logic, different architectures, or the like. Thus, the scope of the techniques and/or functions described is not limited by the particular order, selection, or decomposition of aspects described with reference to any particular routine, module, component, or the like.

Example Processes

Figure 4A:
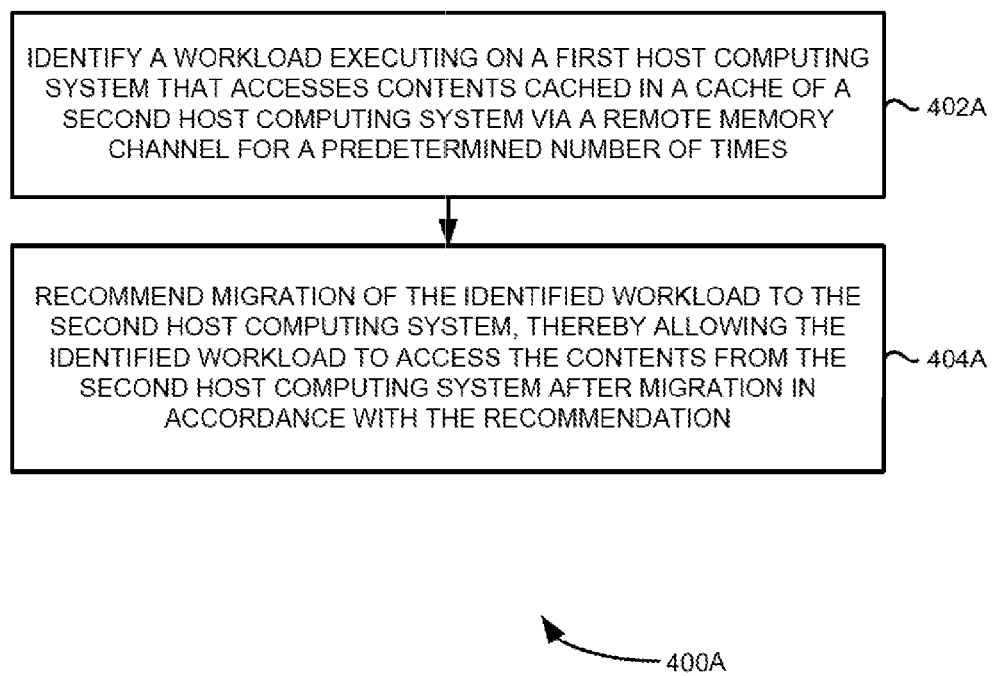
FIG. 4A is a flow diagram of a process for creating a workload migration recommendation in a virtual computing environment, according to an example embodiment.

FIG. 4A is a flow diagram 400A of a process for creating a Workload migration recommendation in a virtual computing environment, according to an example embodiment. At block 402A, a workload executing on a first host computing system that accesses contents cached in a cache of a second host computing system via a remote memory channel for a predetermined number of times is identified. At block 404A, migration of the identified workload to the second host computing system is recommended, thereby allowing the identified workload to access the contents from the second host computing system after migration in accordance with the recommendation. This is explained in more detail with reference to FIG. 4B.

Figure 4B:
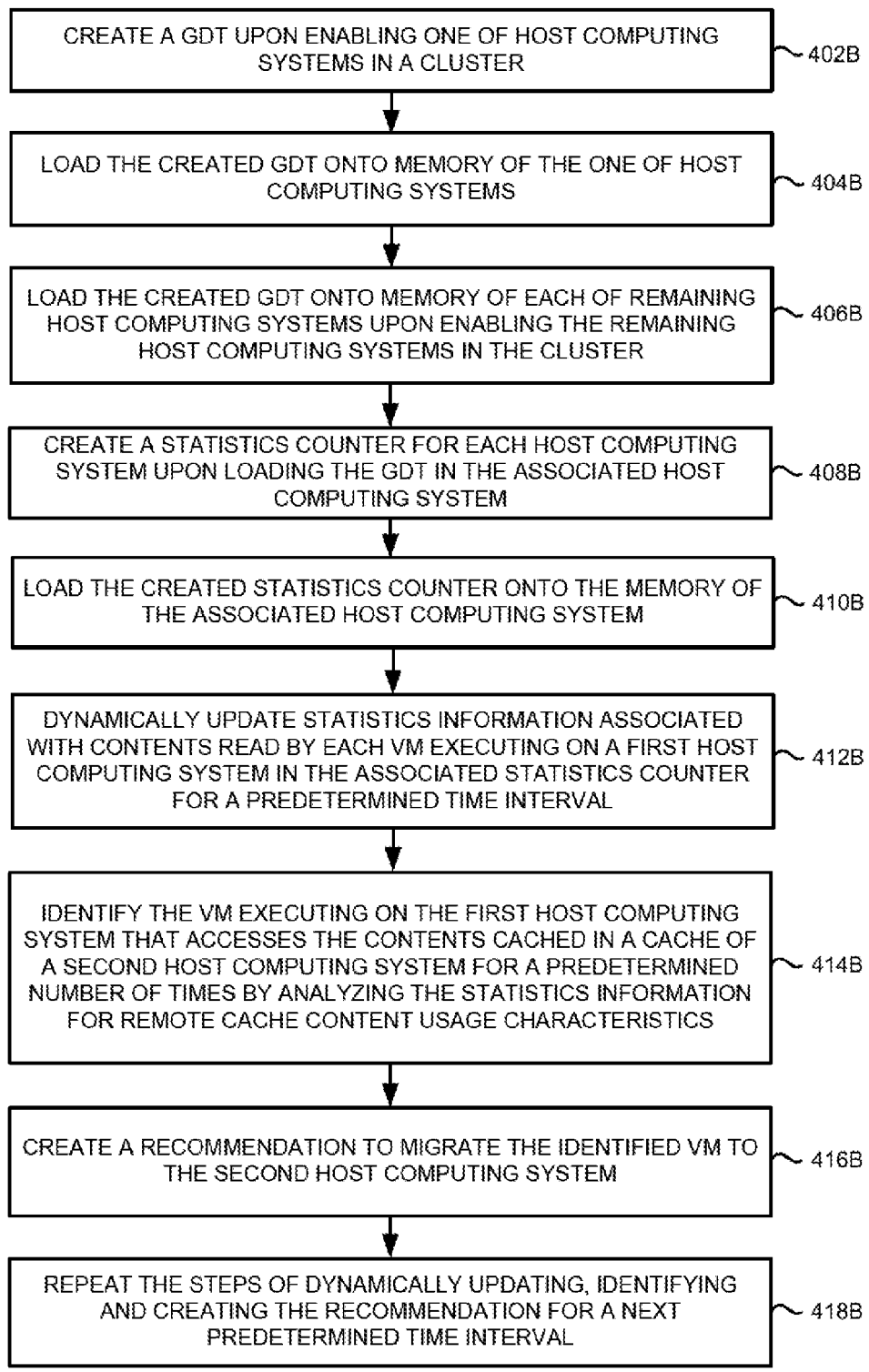
FIG. 4B is a flow diagram of a process for migrating workloads across host computing systems based on remote cache content usage characteristics in a virtual computing environment, according to an example embodiment.

FIG. 4B is a flow diagram 400B of a process for migrating VMs across host computing systems in a cluster based on remote cache content usage characteristics in a virtual computing environment, according to an example embodiment. FIG. 4B illustrates migrating the VMs across the host computing systems based on the remote cache content usage characteristics that may be performed by, for example, one or more modules of a DHC controller, a DHC handler and/or a DHC analyzer residing in a management server described above.

Figure 3:
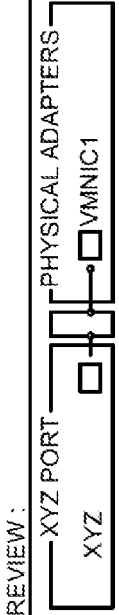
FIG. 3 is a screenshot showing configuring of a cache digest trunk (CDT), according to an example embodiment.

At block 402B, a GDT is created upon enabling one of the host computing systems in the cluster. In these embodiments, the GDT includes hash signatures of metadata associated with current read contents and associated host computing system IDs. Example contents include a length of 4 kilo bytes. The host computing IDs are assigned unique host computing IDs used for tagging the host computing systems in the GDT. The table 200 in FIG. 2 shows an example GDT. At block 404B the created GDT is loaded onto memory of the one of the host computing systems. At block 406B, the GDT is loaded onto memory of each of remaining host computing systems in the cluster via a CDT upon enabling the remaining host computing systems in the cluster. For example, the CDT is configured via kernel network settings as shown in FIG. 3. In one example, the CDT is used to share the GDT across the host computing systems.

At block 408B, a statistics counter is created for each host computing system upon loading the GDT in the associated host computing system. For example, a statistics counter includes statistics information associated with current read contents by each VM executing on an associated host computing system. In this example, the statistics information includes information associated with locations of VMs in a host computing system, contents requested by each VM and a frequency of read requests made for same contents by each VM in the host computing system. At block 410B, the created statistics counter is loaded onto the memory of the associated host computing system.

At block 412B, statistics information associated with contents read by each VM executing on a first host computing system is dynamically updated in the associated statistics counter for a predetermined time interval. In one embodiment, read requests for contents stored in VMDK files located in a VMFS storage are received from VMs associated with the host computing systems in the cluster. Further, a check is made to determine whether each requested content associated with a VM executing on the first host computing system is in one of a cache of the first host computing system or a cache of a second host computing system using the GDT residing in the first host computing system. Further, the VM is allowed to read the requested contents from the one of the cache of the first host computing system or second host computing system and the statistics information associated with the contents is dynamically updated in the statistics counter residing in the first host computing system when the requested contents associated with the VM executing on the first host computing system are in the one of the cache of the first host computing system or second host computing system. Furthermore, the VM is allowed to read any of remaining requested contents from the VMFS storage, the read contents are stored in the cache of the first host computing system, and the hash signatures of the metadata associated with the read contents along with the associated host computing system IDs are added in the GDT. Moreover, the step of determining is repeated for the predetermined time interval.

In some embodiments, anytime a hash signature of metadata associated with current read content along with the associated host computing ID is added to one of the GDTs, all remaining GDTs in the cluster are substantially simultaneously updated via the CDT. Further in some embodiments, anytime a host computing system gets added to the cluster, the GDT is substantially simultaneously replicated to memory of the added host computing system via the CDT. Also in some embodiments, any time a host computing system is removed from the cluster, each GDT is substantially simultaneously updated by removing corresponding hash signatures and an associated host computing system ID via the CDT.

At block 414B, the VM executing on the first host computing system that accesses the contents cached in the cache of the second host computing system for a predetermined number of times is identified by analyzing the statistics information for remote cache content usage characteristics. The remote cache content usage characteristics may include a frequency of read requests made for contents cached in other host computing systems by each VM executing on a host computing system. At block 416B, a recommendation to migrate the identified VM to the second host computing system is created based on the outcome of the analysis. At block 418B, the process steps 412B, 414B and 416B are repeated for a next predetermined time interval.

Example Computing System Implementation

Figure 5:
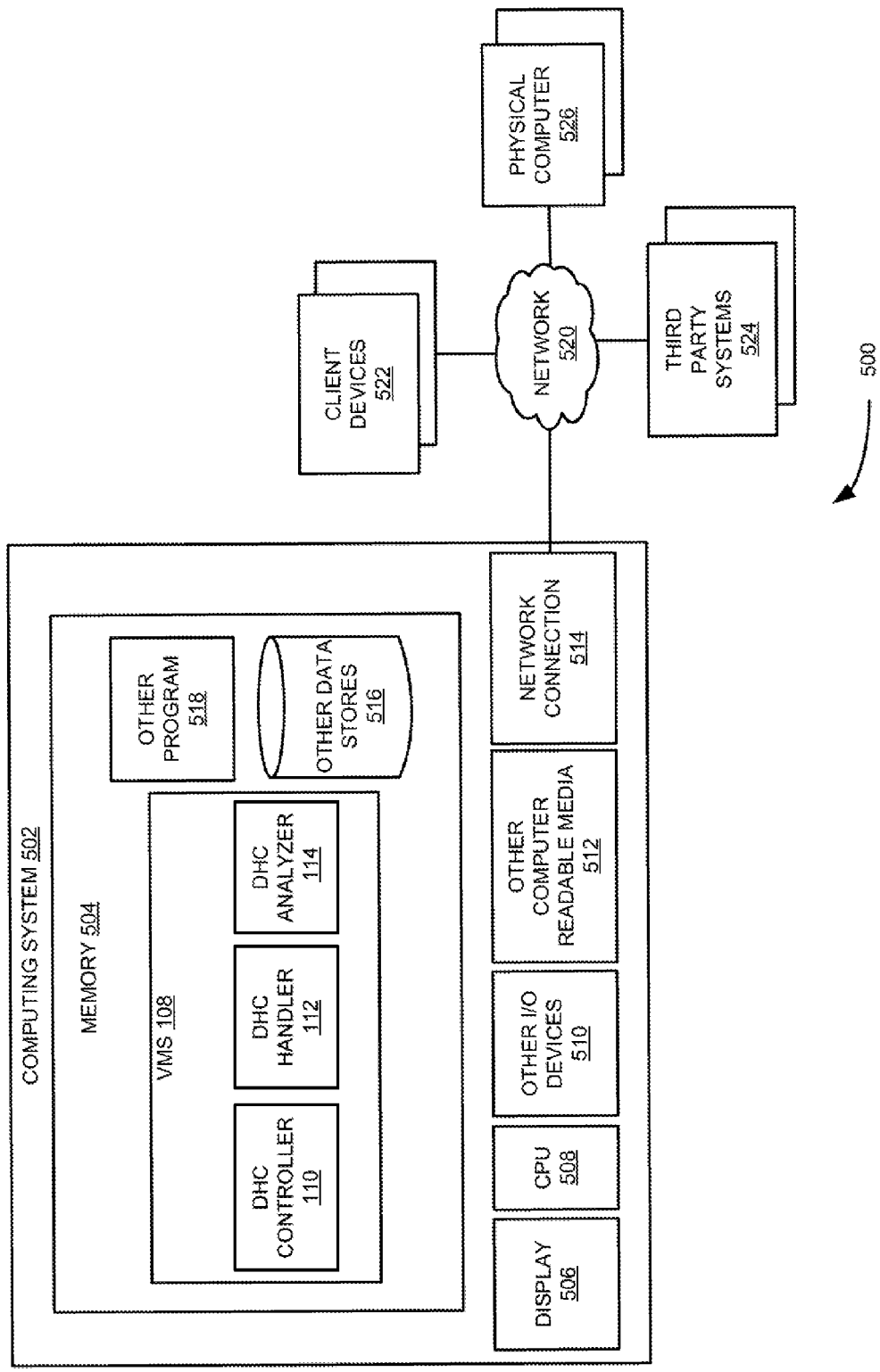
FIG. 5 is a block diagram of a computing system for migrating the workloads across the host computing systems based on the remote cache content usage characteristics in the virtual computing environment, according to an example embodiment.

FIG. 5 is a block diagram 500 of an example computing system for migrating VMs across host computing systems based on remote cache content usage characteristics in a virtual computing environment, according to an example embodiment. In particular, FIG. 5 shows computing system 502 that may be utilized to implement VMS 108, such as shown in FIG. 1.

Note that one or more general purpose virtual or physical computer systems suitably instructed may be used to implement VMS 108 including DHC controller 110, DHC handler 112 and/or DHC analyzer 114 (shown in FIG. 1). In addition, computing system 502 may comprise one or more distinct computing systems/devices and may span distributed locations. Furthermore, each block shown may represent one or more such blocks as appropriate to a specific embodiment or may be combined with other blocks. Also, VMS 108 including DHC controller 110, DHC handler 112 and/or DHC analyzer 114 may be implemented in software, hardware, firmware, or in some combination to achieve the capabilities described herein.

In the embodiment shown, computing system 502 may comprise computer memory ("memory") 504, display 506, one or More Central Processing Units ("CPU") 508, Input/output (I/O) devices 510 (e.g., keyboard, mouse, etc.), other computer-readable media 512, and network connections 514. VMS 108 is shown residing in memory 504. The components of VMS 108 may execute on one or more CPUs 508 and implement techniques described herein. Other code or programs 518 (e.g., an administrative interface, a Web server, and the like) and potentially other data repositories, such as data store 516, may also reside in memory 504, and execute on one or more CPUs 508. One or more of the components in FIG. 5 may not be present in any specific implementation. For example, some embodiments may not provide other computer readable media 512 or display 506.

VMS 108 interacts via network 520 with client devices 522, physical computers 526, and/or third-party systems/applications 524. Network 520 may be any combination of media (e.g., twisted pair, coaxial, fiber optic, radio frequency), hardware (e.g., routers, switches, repeaters, transceivers), and protocols (e.g., TCP/IP, UDP, Ethernet, Wi-Fi, WiMAX) that facilitate communication to and from remotely situated humans and/or devices.

As discussed above with reference to FIG. 1, VMS 108 including DHC controller 110, DHC handler 112 and/or DHC analyzer 114 migrates VMS across host computing systems based on remote cache content usage characteristics in the virtual network environment. The architecture shown in FIG. 5 may in some embodiments be partially or fully virtualized. For example, computing system 502 may be one or possibly many VMs executing on physical hardware and managed by a hyper-visor, virtual machine monitor, or similar technology. Also, physical computers 526 may include virtualization logic to manage multiple VMs.

In an example embodiment, components/modules of VMS 108 are implemented using standard programming techniques. For example, VMS 108 may be implemented as a "native" executable running on CPU 508, along with one or more static or dynamic libraries. In other embodiments, VMS 108 may be implemented as instructions processed by a VM that executes as one of other programs 518.

The embodiments described above may also use either well-known or proprietary synchronous or asynchronous client-server computing techniques. Also, the various components may be implemented using more monolithic programming techniques, for example, as an executable running, on a single CPU computer system, or alternatively decomposed using a variety of structuring techniques known in the art including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported. Also, other functions could be implemented and or performed by each component/module, and in different orders, and by different components/modules, yet still achieve the described functions.

Furthermore, in some embodiments, some or all of the components of VMS 108 may be implemented or provided in other manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a non-transitory computer-readable storage medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the components and/or data structures may be stored on tangible, non-transitory storage mediums. Some or all of the system components and data structures may also be provided as data signals (e.g., by being encoded as part of a carrier wave or included as part of an analog or digital propagated signal) on a variety of computer-readable transmission mediums, which are then transmitted, including across wireless based and wired/cable-based mediums, and may take a variety of forms as part of a single or multiplexed analog signal, or as multiple discrete digital packets or frames). Such computer program products may also take other forms in other embodiments. Accordingly, embodiments of this disclosure may be practiced with other computer system configurations.

Further, from the foregoing it will be appreciated that, although specific embodiments have been described herein for purposes of illustration, various modifications may be made without deviating from the spirit and scope of this disclosure. For example, the methods, techniques, and systems for migrating the VMs across host computing systems based on the remote cache content usage characteristics in the virtual computing environment are applicable to other architectures or in other settings. Also, the methods, techniques, and systems discussed herein are applicable to differing protocols, communication media (optical, wireless, cable, etc.) and devices (e.g., desktop computers, wireless handsets, electronic organizers, personal digital assistants, tablet computers, portable email machines, game machines, pagers, navigation devices, etc.).

The invention claimed is:

1. A method of creating a workload migration recommendation, comprising:
identifying, by a virtual management software (VMS) module residing in memory and executed by a processor, a workload executing on a first host computing system that accesses contents cached in a cache of a second host computing system via a remote memory channel for a predetermined number of times; and
recommending, by the VMS module, migration of the identified workload to the second host computing system, based on remote cache content usage characteristics, wherein the remote cache content usage characteristics comprise a frequency of read requests made for the contents cached in the second host computing system by the workload executing on the first host computing system, wherein the identified workload is to access the contents cached in the cache of the second host computing system after migration in accordance with the recommendation.

2. The method of claim 1, wherein identifying the workload executing on the first host computing system that accesses contents cached in the cache of the second host computing system via the remote memory channel for the predetermined number of times, comprises:
dynamically updating statistics information associated with contents read by each workload executing on the first host computing system in an associated statistics counter for a predetermined time interval, wherein the statistics counter residing in the first host computing system comprises statistics information associated with current read contents by each workload executing on the first host computing system; and
identifying the workload executing on the first host computing system that accesses the contents cached in the cache of the second host computing system for the predetermined number of times by analyzing the statistics information for the remote cache content usage characteristics.

3. The method of claim 2, wherein recommending migration of the identified workload to the second host computing system, comprises:
creating a recommendation to migrate the identified workload to the second host computing system based on the outcome of the analysis.

4. The method of claim 3, further comprising:
repeating the steps of dynamically updating, identifying and creating the recommendation for a next predetermined time interval.

5. The method of claim 2, wherein the statistics information comprises information associated with locations of workloads in the host computing systems, contents requested by the workloads, and a frequency of read requests made for same contents by each workload and wherein the remote cache content usage characteristics comprise a frequency of read requests made for contents cached in other host computing systems by each workload executing on a host computing system.

6. A method of creatin a workload migration recommendation, comprising
dynamically updating, by a virtual management software (VMS) module residing in memory and executed by a processor, statistics information associated with contents read by each workload executing on a first host computing system in an associated statistics counter for a predetermined time interval, wherein dynamically updating the statistics information comprises:
determining whether each requested content associated with a workload executing on the first host computing system is in one of a cache of the first host computing system or a cache of a second host computing system using a global digest table (GDT) residing in the first host computing system, wherein the CDT residing in each of host computing systems in a cluster includes hash signatures of metadata associated with current read contents and associated host computing system identifiers (IDs); and
if so, allowing the workload to read the requested contents from the one of the cache of the first host computing system or second host computing system and dynamically updating the statistics information associated with the contents in the statistics counter residing in the first host computing system;
identifying by the VMS module, the workload executing on the first host computing system that accesses the contents cached in the cache of the second host computing system via a remote memory channel for a predetermined number of times by analyzing the statistics information for the remote cache content usage characteristics; and
recommending, by the VMS module, migration of the identified workload to the second host computing system, wherein the identified workload is to access the contents cached in the cache of the second host computing system after migration in accordance with the recommendation.

7. The method of claim 6, further comprising:
if not, allowing the workload to read any of remaining requested contents from storage devices, storing the read contents in the cache of the first host computing system, and adding the hash signatures of the metadata associated with the read contents along with the associated host computing system IDs in the GDT.

8. The method of claim 7, further comprising:
repeating the step of determining for the predetermined time interval.

9. The method of claim 6, further comprising:
receiving read requests for the contents stored in storage devices from the workloads associated with the host computing systems in the cluster.

10. The method of claim 6, further comprising:
creating a GDT upon enabling one of the host computing systems in the cluster; loading the created GDT onto memory of the one of the host computing systems; and
loading the created GDT onto memory of each of remaining host computing systems upon enabling the remaining host computing systems in the cluster via a cache digest trunk (CDT).

11. The method of claim 10, further comprising:
creating a statistics counter for each host computing system upon loading the GDT in the associated host computing system; and
loading the created statistics counter onto the memory of the associated host computing system.

12. The method of claim 10, further comprising:
substantially simultaneously updating each of remaining GDTs upon adding a hash signature of metadata associated with current read content along with an associated host computing system ID in one of the GDTs via the CDT.

13. The method of claim 10, further comprising:
substantially simultaneously updating each GDT by removing corresponding hash signatures and associated host computing system IDs via the CDT upon removing any one of the host computing systems in the cluster.

14. The method of claim 10, further comprising:
substantially simultaneously creating a replica of the GDT in a host computing system via the CDT upon adding the host computing system in the cluster.

15. A system, comprising:
multiple host computing systems, wherein each host computing system executing multiple workloads; and
a management server communicatively coupled to the multiple host computing systems, wherein the management server comprises a processor and memory to store virtual management software (VMS), which is executed by the processor, to create a workload migration recommendation in a virtual computing environment, by:
identifying a workload executing on a first host computing system that accesses contents cached in a cache of a second host computing system via a remote memory channel for a predetermined number of times; and
recommending migration of the identified workload to the second host computing system based on remote cache content usage characteristics, wherein the remote cache content usage characteristics comprise a frequency of read requests made for the contents cached in the second host computing system by the workload executing on the first host computing system, wherein the identified workload is to access the contents cached in the cache of the second host computing system after migration in accordance with the recommendation.

16. The system of claim 15, wherein the VMS is configured to:
dynamically update statistics information associated with contents read by each workload executing on the first host computing system in an associated statistics counter for a predetermined time interval, wherein the statistics counter residing in the first host computing system comprises statistics information associated with current read contents by each workload executing on the first host computing system; and
identify the workload executing on the first host computing system that accesses the contents cached in the cache of the second host computing system for the predetermined number of times by analyzing the statistics information for the remote cache content usage characteristics.

17. The system of claim 16, wherein the VMS is further configured to:
create a recommendation to migrate the identified workload to the second host computing system based on the outcome of the analysis.

18. The system of claim 17, wherein the VMS is further configured to:
repeat the steps of dynamically updating, identifying and creating the recommendation for a next predetermined time interval.

19. The system of claim 16, wherein the statistics information comprises information associated with locations of workloads in the host computing systems, contents requested by the workloads, and a frequency of read requests made for same contents by each workload and wherein the remote cache content usage characteristics comprise a frequency of read requests made for contents cached in other host computing systems by each workload executing on a host computing system.

20. A system comprising:
multiple host computing systems, wherein each host computing system executing multiple workloads; and
a management server communicatively coupled to the multiple host computing systems, wherein the management server comprises a processor and memory to store virtual management software (VMS), which is executed by the processor, to create a workload migration recommendation in a virtual computing environment, by:
dynamically updating statistics information associated with contents read by each workload executing on a first host computing system in an associated statistics counter for a predetermined time interval, wherein dynamically updating the statistics information comprises:
determine whether each requested content associated with a workload executing on the first host computing system is in one of a cache of the first host computing system or a cache of a second host computing system using a global digest table (GDT) residing in the first host computing system, wherein the GDT residing in each of the multiple host computing systems in a cluster includes hash signatures of metadata associated with current read contents and associated host computing system identifiers (IDs); and
if so, allow the workload to read the requested contents from the one of the cache of the first host computing system or second host computing system and dynamically update the statistics information associated with the contents in the statistics counter residing in the first host computing system;
identifying the workload executing on the first host computing system that accesses the contents cached in the cache of the second host computing system via a remote memory channel for a predetermined number of times by analyzing the statistics information for remote cache content usage characteristics; and
recommending migration of the identified workload to the second host computing system, wherein the identified workload is to access the contents cached in the cache of the second host computing system after migration in accordance with the recommendation.

21. The system of claim 20, further comprising:
storage devices communicatively coupled to the multiple host computing systems, wherein the storage devices comprise virtual memory disk (VMDK) files associated with the workloads in the cluster.

22. The system of claim 21, wherein the VMS is further configured to:
if not, allow the workload to read any of remaining requested contents from the VMDK file located in the storage devices, store the read contents in the cache of the first host computing system, and add the hash signatures of the metadata associated with the read contents along with the associated host computing system IDs in the GDT.

23. The system of claim 22, wherein the VMS is further configured to:
repeat the step of determining for the predetermined time interval.

24. The system of claim 21, wherein the VMS is further configured to:
receive read requests for the contents stored in the VMDK files located in the storage devices from the workloads associated with the multiple host computing systems in the cluster.

25. The system of claim 20, wherein the VMS is further configured to:
create a GDT upon enabling one of the host computing systems in the cluster;
load the created CDT onto memory of the one of the host computing systems; and
load the created DT onto memory of each of remaining host computing systems upon enabling the remaining host computing systems in the cluster via a cache digest trunk (CDT).

26. The system of claim 25, wherein the VMS is further configured to:
create a statistics counter for each host computing system upon loading the GDT in the associated host computing system; and
load the created statistics counter onto the memory of the associated host computing system.

27. The system of claim 25, wherein the VMS is further configured to:
substantially simultaneously update each of remaining GDTs upon adding a hash signature of metadata associated with current read content along with an associated host computing system ID in one of the GDTs via the CDT.

28. The system of claim 25, wherein the VMS is further configured to:
substantially simultaneously update each GDT by removing corresponding hash signatures and associated host computing system IDs via the CDT upon removing any one of the host computing systems in the cluster.

29. The system of claim 25, wherein the VMS is further configured to:
substantially simultaneously create a replica of the GDT in a host computing system via the CDT upon adding the host computing system in the cluster.

30. A non-transitory computer-readable storage medium including instructions that are configured, when executed by a computing device, to perform a method of creating a workload migration recommendation, the method comprising:

identifying a workload executing on a first host computing system that accesses contents cached in a cache of a second host computing system via a remote memory channel for a predetermined number of times; and
recommending migration of the identified workload to the second host computing system based on remote cache content usage characteristics, wherein the remote cache content usage characteristics comprise a frequency of read requests made for the contents cached in the second host computing system by the workload executing on the first host computing system, wherein the identified workload is to access the contents cached in the cache of the second host computing system after migration in accordance with the recommendation.

31. The non-transitory computer-readable storage medium of claim 30, wherein identifying the workload executing on the first host computing system that accesses the contents cached in the cache of the second host computing system via the remote memory channel for the predetermined number of times, comprises:
dynamically updating statistics information associated with contents read by each workload executing on the first host computing system in an associated statistics counter for a predetermined time interval, wherein the statistics counter residing in the first host computing system comprises statistics information associated with current read contents by each workload executing on the first host computing system; and
identifying the workload executing on the first host computing system that accesses the contents cached in the cache of the second host computing system for the predetermined number of times by analyzing the statistics information for the remote cache content usage characteristics.

32. The non-transitory computer-readable storage medium of claim 31, wherein recommending migration of the identified workload to the second host computing system, comprises:
creating a recommendation to migrate the identified workload to the second host computing system based on the outcome of the analysis.

33. The non-transitory computer-readable storage medium of claim 32, further comprising:
repeating the steps of dynamically updating, identifying and creating the recommendation for a next predetermined time interval.

34. The no-transitory computer-readable storage medium of claim 31, wherein the statistics information comprises information associated with locations of workloads in the host computing systems, contents requested by the workloads, and a frequency of read requests made for same contents by each workload and wherein the remote cache content usage characteristics comprise a frequency of read requests made for contents cached in other host computing systems by each workload executing on a host computing system.

35. A non-transitory computer-readable storage medium including instructions that are configured, when executed by a computing device, to perform a method of creating a workload migration recommendation, the method comprising:
dynamically updating statistics information associated with contents read by each workload executing on a first host computing system in an associated statistics counter for a predetermined time interval, wherein dynamically updating the statistics information comprises:

determining whether each requested content associated with a workload executing on the first host computing system is in one of a cache of the first host computing system or a cache of a second host computing system using a global digest table (GDT) residing in the first host computing system, wherein the GDT residing in each of host computing systems in a cluster includes hash signatures of metadata associated with current read contents and associated host computing system identifiers (IDs); and if so, allowing the workload to read the requested contents from the one of the cache of the first host computing system or second host computing system and dynamically updating the statistics information associated with the contents in the statistics counter residing in the first host computing system;

identifying the workload executing on the first host computing system that accesses the contents cached in the cache of the second host computing system via a remote memory channel for a predetermined number of times by analyzing the statistics information for remote cache content usage characteristics; and recommending migration of the identified workload to the second host computing system, wherein the identified workload is to access the contents cached in the cache of the second host computing system after migration ia accordance with the recommendation.

36. The non-transitory computer-readable storage medium of claim 35, further comprising:

if not, allowing the workload to read any of remaining requested contents from storage devices, storing the read contents in the cache of the first host computing system, and adding the hash signatures of the metadata associated with the read contents along with the associated host computing system IDs in the GDT.

37. The non-transitory computer-readable storage medium of claim 36, further comprising:

repeating the step of determining for the predetermined time interval.

38. The non-transitory computer-readable storage medium of claim 35, further comprising:

receiving read requests for the contents stored in storage devices from the workloads associated with the host computing systems in the cluster.

39. The non-transitory computer-readable storage medium of claim 35, further comprising:

creating a GDT upon enabling one of the host computing systems in the cluster;

loading the created GDT onto memory of the one of the host computing systems; and loading the created GDT onto memory of each of remaining host computing systems upon enabling the remaining host computing systems in the cluster via a cache digest trunk (CDT).

40. The non-transitory computer-readable storage medium of claim 39, further comprising:

creating a statistics counter for each host computing system upon loading the GDT in the associated host computing system; and loading the created statistics counter onto the memory of the associated host computing system.

41. The non-transitory computer-readable storage medium of claim 40, further comprising:

substantially simultaneously updating each of remaining GDTs upon adding a hash signature of metadata associated with current read content along with an associated host computing system ID in one of the GDTs via the CDT.

\* \* \* \* \*